US008910586B2

United States Patent
Redler et al.

(10) Patent No.: US 8,910,586 B2
(45) Date of Patent: Dec. 16, 2014

(54) PRECISION SEASONER

(71) Applicant: Precision Seasoning LLC, Wichita, KS (US)

(72) Inventors: Scott Elliot Redler, Wichita, KS (US); Robert Allen Wood, Lincoln, NE (US); Todd Francis Dechant, Wichita, KS (US)

(73) Assignee: Precision Seasoning LLC, Wichita, KS (US)

( * ) Notice: Subject to any disclaimer, the term of this patent is extended or adjusted under 35 U.S.C. 154(b) by 0 days.

(21) Appl. No.: 13/800,092

(22) Filed: Mar. 13, 2013

(65) Prior Publication Data

US 2013/0263781 A1  Oct. 10, 2013

Related U.S. Application Data

(60) Provisional application No. 61/622,326, filed on Apr. 10, 2012, provisional application No. 61/649,122, filed on May 18, 2012, provisional application No. 61/666,090, filed on Jun. 29, 2012.

(51) Int. Cl.
*A23P 1/08* (2006.01)

(52) U.S. Cl.
CPC ............................... *A23P 1/082* (2013.01)
USPC .................... 118/13; 118/24; 118/31

(58) Field of Classification Search
CPC ......... A23P 1/082; A23L 1/005; A23L 1/217; A23B 4/32; A23B 4/325
USPC ............... 118/13, 24, 31; 99/494; 426/289
See application file for complete search history.

(56) References Cited

U.S. PATENT DOCUMENTS

| | | |
|---|---|---|
| 3,989,166 A | 11/1976 | Saunders |
| 4,614,162 A | 9/1986 | Ryan et al. |
| 6,269,983 B1 | 8/2001 | Jones et al. |
| 8,051,795 B2 | 11/2011 | Dorsten et al. |
| 2003/0154915 A1 | 8/2003 | Rooke |
| 2004/0089677 A1 | 5/2004 | Schwartzman |
| 2005/0258189 A1 | 11/2005 | Peterson et al. |
| 2008/0023101 A1* | 1/2008 | Rudesill et al. ............... 141/248 |
| 2008/0063767 A1* | 3/2008 | Sus et al. ....................... 426/413 |
| 2009/0031946 A1* | 2/2009 | Alverde Trejo ................ 118/17 |
| 2010/0224650 A1 | 9/2010 | Antal, Sr. |

OTHER PUBLICATIONS

Server; Product Description; Pumps/Dispensers SEASON2TASTE(TM) Shaker; Model S2T 85100; Copyright date unknown.
KitcheNova; Product Description; KitchenArt Easy Measure Salt and Spice Dispenser; http://www.kitchenova.com/servlet/the-697/kitchenart-spice-measure-dispenser/Detail; Copyright dated 2011.

* cited by examiner

*Primary Examiner* — Laura Edwards
(74) *Attorney, Agent, or Firm* — Hovey Williams LLP (57) ABSTRACT

A seasoning apparatus and method for evenly and consistently seasoning french fries or other food. The seasoning apparatus may include a hollow hopper for holding and selectively dispensing seasoning therefrom and a plurality of actuatable dispensing elements each translatably attached to the hopper and each having a holding compartment formed therein. The actuatable dispensing elements may receive seasoning in the holding compartment from the hopper. When translated to a dispensing position, the dispensing elements may dispense seasoning from the holding compartment. The seasoning apparatus may also include a seasoning spreader for spreading seasoning dispensed from the actuatable dispensing elements and a food-holding container fixed a distance below the hopper and seasoning spreader. The food-holding container may have a weighing device coupled with a controller for determining an amount of seasoning to dispense from the hopper and actuating the actuatable dispensing elements accordingly.

15 Claims, 8 Drawing Sheets

PRECISION SEASONER

RELATED APPLICATION

The present application is a nonprovisional patent application and claims priority benefit, with regard to all common subject matter, of earlier-filed U.S. provisional patent application titled, "Precision Seasoner", Ser. No. 61/622,326, filed Apr. 10, 2012, U.S. provisional patent application titled, "Precision Seasoner", Ser. No. 61/649,122, filed May 18, 2012, and U.S. provisional patent application titled, "Precision Seasoner", Ser. No. 61/666,090, filed Jun. 29, 2012, all three of which are incorporated by reference in their entireties into the present application.

BACKGROUND

French fries are among consumers' favorite foods and provide high profit margins for restaurants. Unfortunately, they are also subject to many consumer complaints because they are often either over-seasoned or under-seasoned. This is because they are frequently made in varying batch sizes, but are seasoned with the same seasoning dispenser regardless of the batch size. For example, seasoning is often applied with shakers, measuring spoons, measuring cups, etc. but users often don't properly measure the seasoning applied by these dispensers to account for the batch size. Furthermore, measuring spoons and cups are generally not well-suited for evenly dispersing a seasoning, but rather just dump the seasoning onto the food all at once. These same problems affect other food items that are typically seasoned after they are prepared and/or are made in varying batch sizes.

Accordingly, there is a need for an apparatus and method for seasoning french fries and other food items that overcomes the limitations of the prior art.

SUMMARY

Embodiments of the present invention provide a seasoning apparatus that more accurately and evenly distributes a desired amount of seasoning on french fries or other food items regardless of the batch size. One embodiment of the seasoning apparatus has a hopper, an actuatable dispensing element, and a seasoning spreader. The hopper holds seasoning therein. The actuatable dispensing element may be translatably attached at a bottom portion of the hopper and dispenses seasoning from the hopper when actuated. The actuatable dispensing element may be, for example, a slide plunger having a holding compartment formed therein for receiving seasoning from the hopper in a holding position and dispensing seasoning from the holding compartment when the slide plunger is actuated to a dispensing position. In some embodiments of the invention, a plurality of actuatable dispensing elements may be attached to the hopper for dispensing different portions or serving sizes of seasoning. The holding compartments may also be adjustable to hold and dispense different amounts of seasoning.

The seasoning spreader may disperse seasoning dispensed from the hopper when the actuatable dispensing element is actuated to the dispensing position. The seasoning spreader may include an impeller and/or a diffuser positioned below the actuatable dispensing element for spinning and/or gravity-spreading seasoning dropped thereon from the hopper. In some embodiments of the invention, the seasoning apparatus may also have a food-holding container fixed a distance below the hopper for holding food therein and receiving the seasoning dispersed by the seasoning spreader. The food-holding container may include or be coupled with a weighing device for weighing food in the food-holding container. In some embodiments of the invention, the seasoning apparatus may have a controller and an electrical actuator or motor. The controller may receive signals indicative of a weight of the food in the food-holding container from the weighing device and send a command signal to the electrical actuator or motor. Then the electrical actuator or motor may actuate the actuatable dispensing elements based on the command signal.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention is intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the present invention is defined only by the claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, step, etc. described in one embodiment may also be included in other embodiments, but is not necessarily included. Thus, the present technology can include a variety of combinations and/or integrations of the embodiments described herein.

FIGS. 1-5 illustrate a seasoning apparatus 10 according to a first embodiment of the present invention. The seasoning apparatus 10 is configured to consistently and evenly season foods including french fries with a desired amount of seasoning.

An embodiment of the seasoning apparatus 10 may comprise a hopper 12, one or more actuatable dispensing elements such as a plurality of slide plungers 14 extending through the hopper 12, a seasoning spreader 16, and a food-holding container 18. Seasoning loaded into the hopper 12 may be dispensed in pre-selected quantities by actuating one or more of the slide plungers 14, thereby dropping seasoning onto the seasoning spreader 16 which then disperses then seasoning into the food-holding container 18. The seasoning apparatus 10 may be a stand-alone seasoner or may be built into a food warmer, a food conveyor system, or any other food processing device. For example, some embodiments of the invention may be mounted on a fry warming station or be built into a top portion of a food warmer.

As illustrated in FIGS. 1-5, the hopper 12 may be a hollow structure with one or more side walls 20, one or more bottom walls 22,24, a top opening 26, a first bottom opening 28 formed through one or more of the bottom walls 22,24, and a second bottom opening 30 formed through one or more of the bottom walls 22,24. The top opening 26 may be a single opening bounded by top edges of the side walls 20 or may be a plurality of openings bounded by at least one of the top edges of the side walls 20 and/or one or more top walls (not shown). In some embodiments of the invention, the bottom walls 22,24 may comprise a first bottom wall 22 and a second bottom wall 24 located below the first bottom wall 22, with the first bottom opening 28 extending through the first bottom wall 22 and the second bottom opening 30 extending through the second bottom wall 24 and not vertically aligned with the first bottom opening 28. Both the first and second bottom openings 28,30 may each comprise a plurality of openings formed through each of the first and second bottom walls 22,24.

In some embodiments of the invention, the second bottom wall 24 may integrally comprise or be attached to a funnel 32 which may direct seasoning dispensed through the second bottom opening 30 onto the seasoning spreader 16. Furthermore, in some embodiments of the invention, the first bottom wall 22 and/or the second bottom wall 24 may be integral (of one-piece construction) with one or more of the sidewalls 20. For example, the first bottom wall 22 described herein may merely be a lower portion of the sidewalls 20 whose lower edges or boundaries form the first bottom opening 28.

In some embodiments of the invention, the top opening 26 of the hopper 12 may have a larger area than the bottom openings 28,30 of the hopper 12. For example, the hopper 12 may have a substantially funnel-like shape, such that a cross-sectional area between the sidewalls 20 at least partially tapers from the top opening 26 to the first and/or second bottom openings 28,30 of the hopper 12. Alternatively, some portions of the hopper 12 may have a funnel-like configuration while other portions of the hopper 12 have a substantially continuous cross-sectional area.

Figure 3:
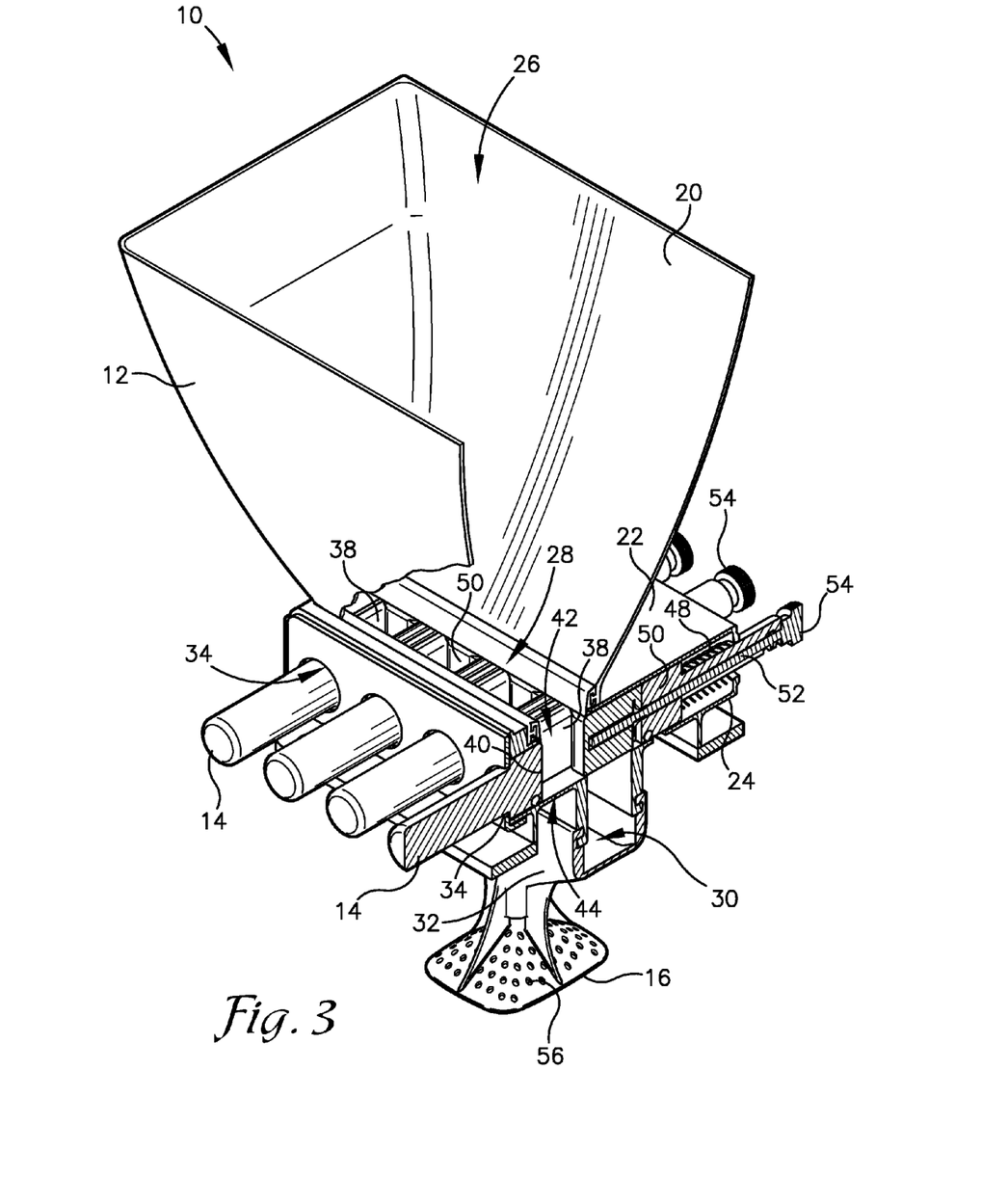
FIG. 3 is a cross-sectional perspective view of the seasoning apparatus, taken along line 3-3 of FIG. 2, and illustrating an adjusting block located in a first position within one of the slide plungers.
Figure 4:
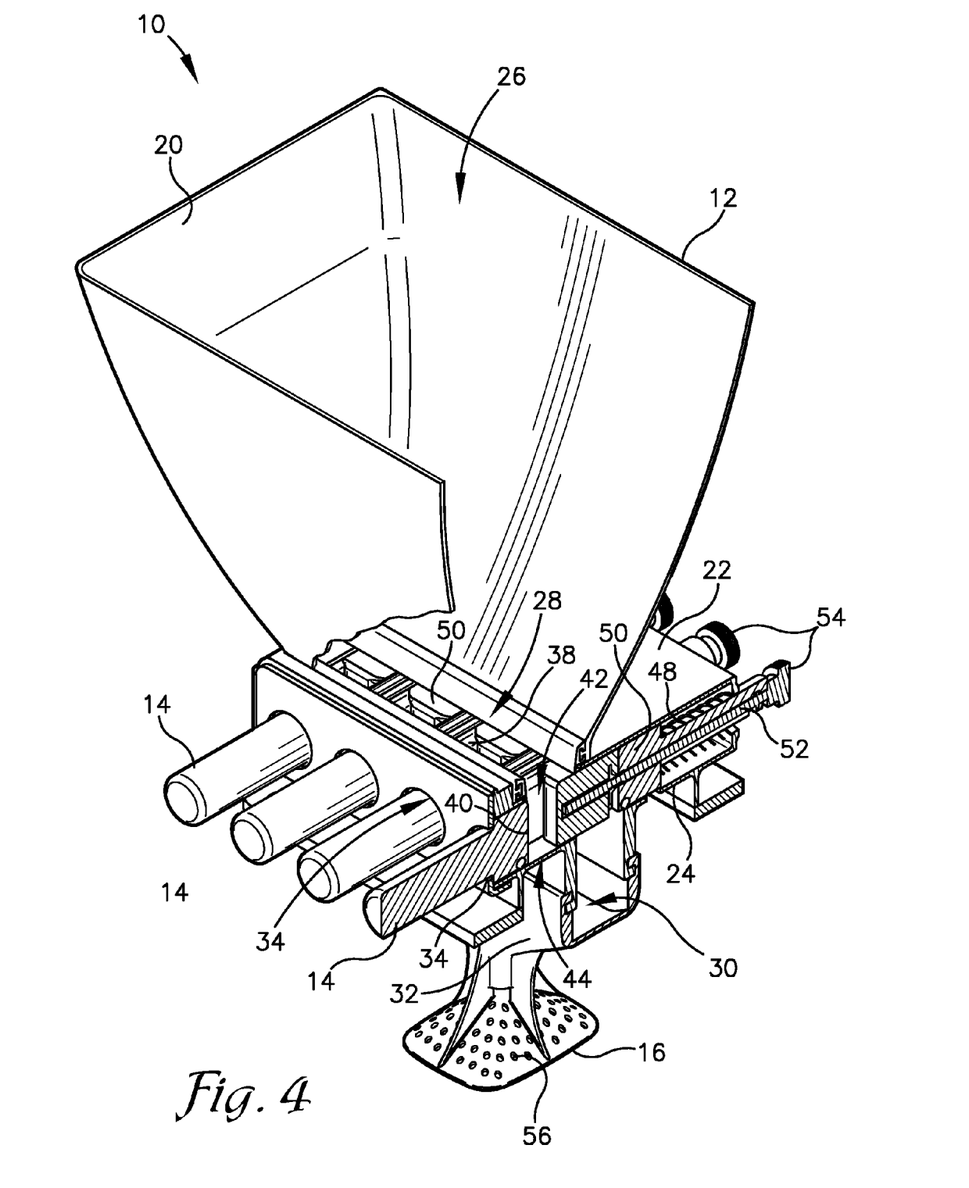
FIG. 4 is a cross-sectional perspective view of the seasoning apparatus, taken along line 3-3 of FIG. 2, and illustrating the adjustment block located in a second position within one of the slide plungers to change a holding volume thereof.
Figure 5:
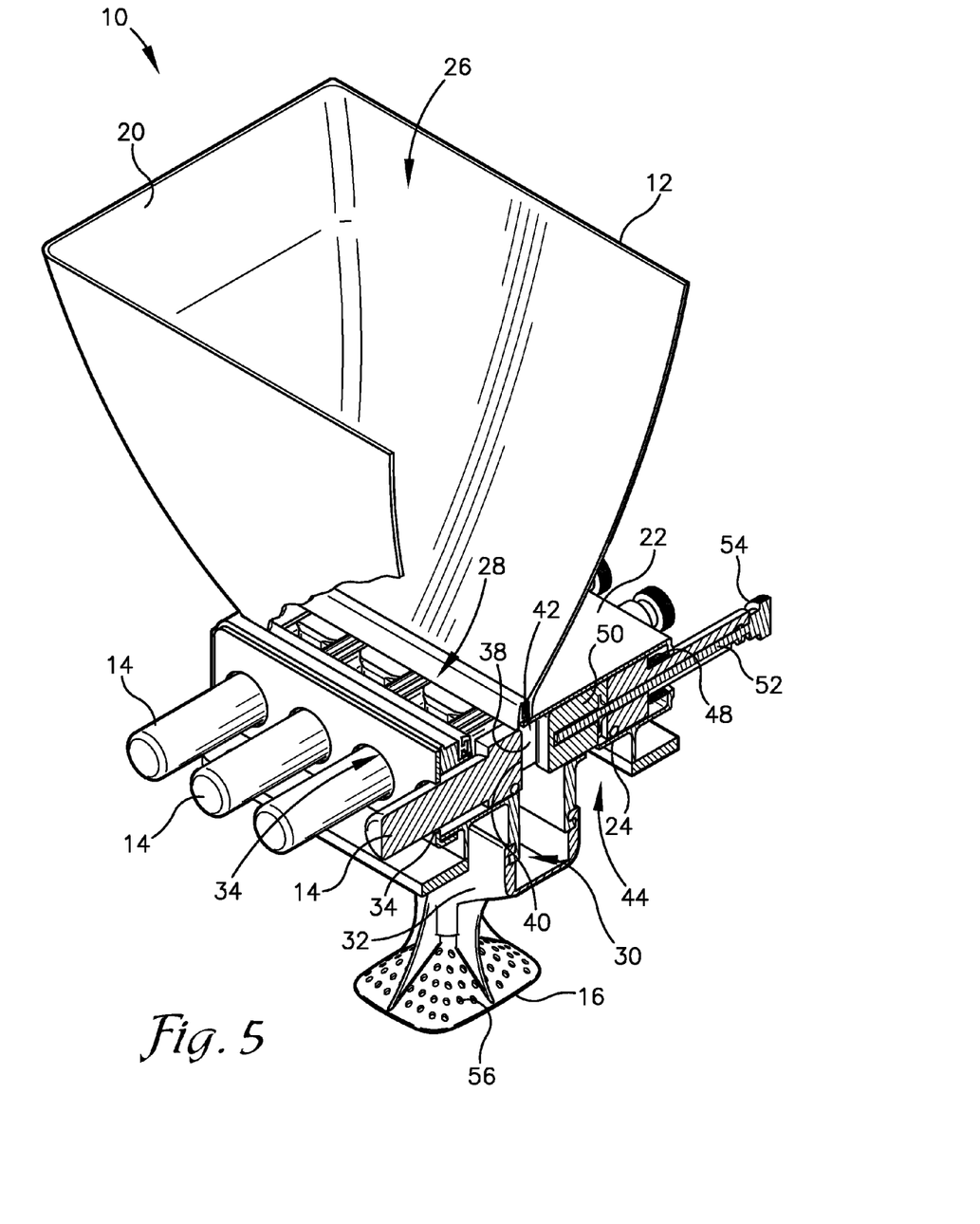
FIG. 5 is a cross-sectional perspective view of the seasoning apparatus, taken along line 3-3 of FIG. 2, and illustrating one of the slide plungers after it is translated from a naturally-biased holding position to a dispensing position.

As illustrated in FIGS. 3-5, the hopper 12 may also have one or more plunger holes 34 formed through at least one of the side walls 20 thereof or through additional sidewalls or structure (such as a faceplate) supporting the first bottom wall 22 a distance above the second bottom wall 24. Specifically, the plunger holes 34 may be configured such that the slide plungers 14 can extend through the plunger holes 34 and slide back and forth therethrough relative to the side walls 20 of the hopper. In some embodiments of the invention, the second bottom opening 30 may be positioned below the slide plungers 14 and may be configured to be aligned with holes or openings in the slide plungers 14 (as described below) when the slide plungers 14 are slid or otherwise actuated to a dispensing position. Furthermore, the second bottom wall 24 may be configured to block seasoning from exiting the holes or openings of the slide plungers 14 when the slide plungers 14 are in their naturally-biased holding positions and are not being actuated to dispense seasoning therefrom. Likewise, the first bottom opening 28 formed through the first bottom wall 22 may be positioned above the slide plungers 14 and may be configured to be aligned with the holes or openings in the slide plungers 14 when the slide plungers 14 are in their naturally-biased holding positions, such that seasoning may flow from the hopper 12 into the slide plungers 14 in their holding positions.

Figure 1:
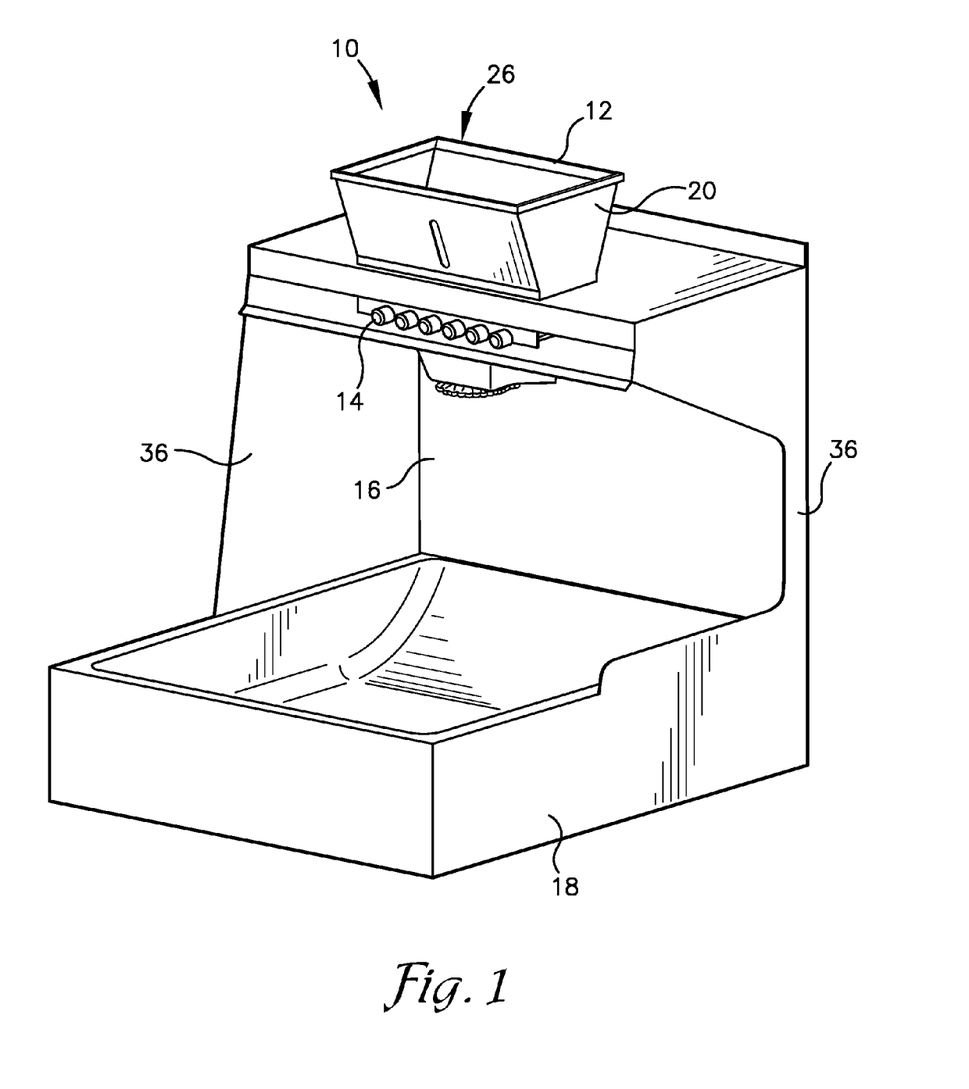
FIG. 1 is a perspective view of a seasoning apparatus constructed in accordance with an embodiment of the present invention.
Figure 2:
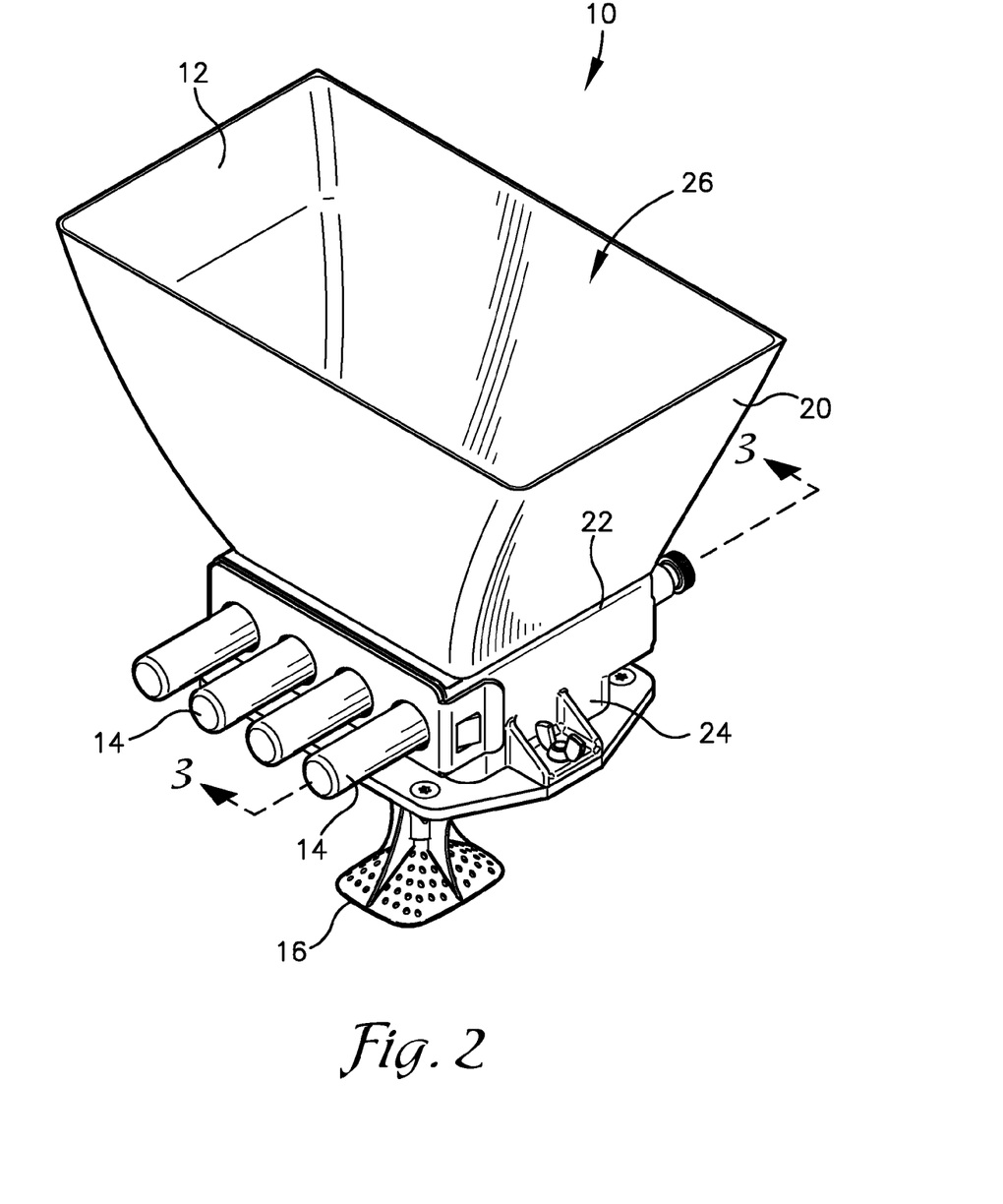
FIG. 2 is a perspective view of the seasoning apparatus of FIG. 1 shown removed from its food-holding container to more clearly illustrate its hopper, slide plungers, and seasoning spreader.

As illustrated in FIG. 1, the hopper 12 may be supported a distance above the food-holding container 18 by any structural elements attachable to or integrally formed with the hopper 12 and/or the food-holding container 18. For example, as illustrated in FIG. 1, a support structure 36 integrally formed with the food-holding container 18 may have one or more side walls extending vertically from the food-holding container 18 and a top wall configured for supporting the hopper 12. The top wall of the support structure 36 may have an opening formed therethrough and at least partially aligned with the second bottom opening 30 of the hopper 12. The opening through the top wall of the support structure 36 may be shaped and configured such that the seasoning spreader 16 and/or a bottom portion of the hopper 12 may extend therethrough.

The hopper may have a lid or other protective covering to protect the seasonings in the hopper and to prevent migration of contaminants into the hopper.

As illustrated in FIGS. 3-7, each of the slide plungers 14 may have hollow compartments 38 of adjustable or fixed sizes configured such that each of the slide plungers 14 may dispense a desired or particular quantity of seasoning. The hollow compartments 38 of the slide plungers 14 may have one or more sidewalls 40, a top inlet opening 42, and a bottom outlet opening 44. In some embodiments of the invention, the slide plungers 14 may have unit markings 46 of measurement molded therein so that a user can adjust the size of one or more of the hollow compartments 38 to desired measured positions to consistently apply preferred seasoning amounts based on the number of servings. For example, as illustrated in FIGS.

Figure 6:
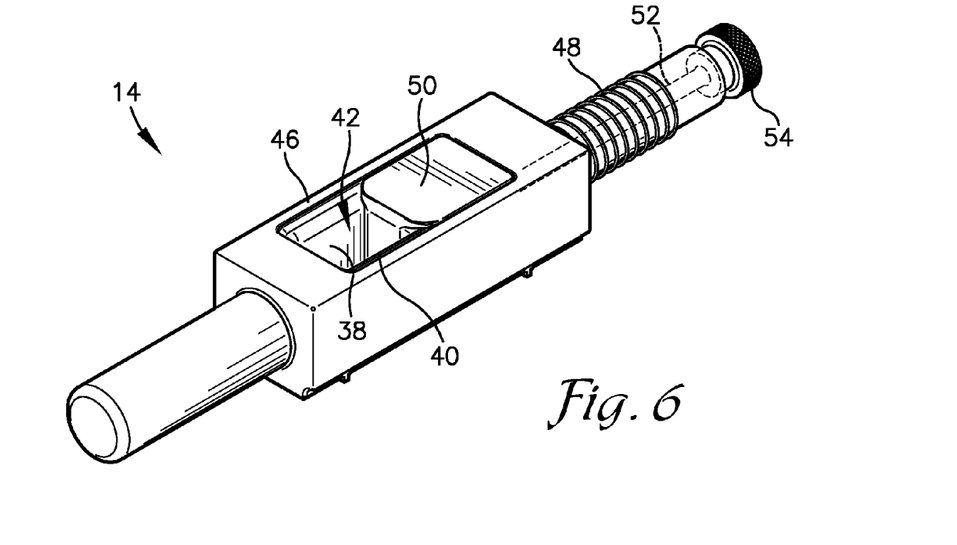
FIG. 6 is a perspective view of one of the slide plungers, illustrating the adjustment block located in the first position.
Figure 7:
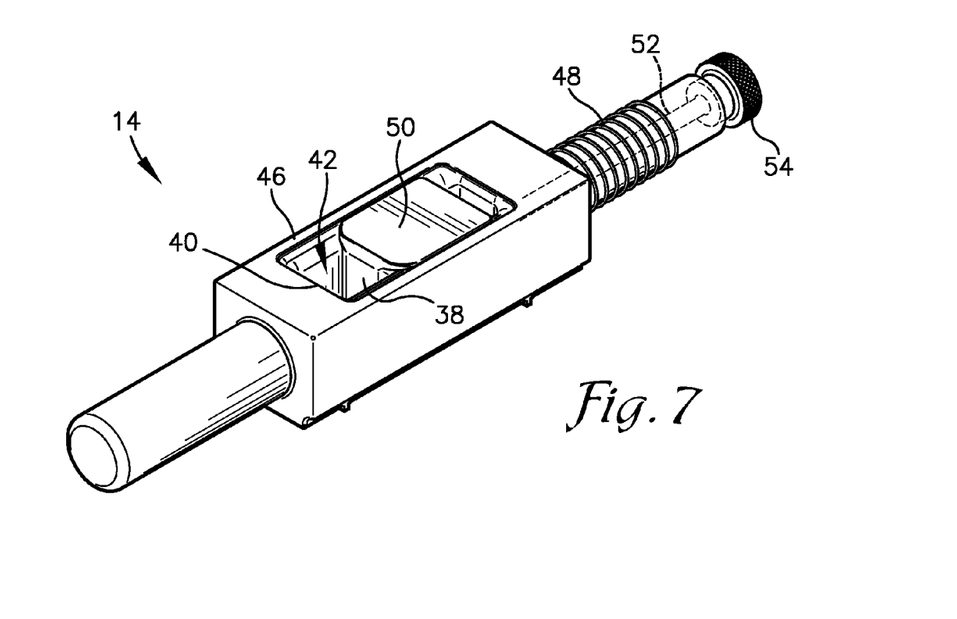
FIG. 7 is a perspective view of the slide plunger of FIG. 6 illustrating the adjustment block located in the second position.

6-7, the unit markings 46 of measurement may be marked in half teaspoon increments or any other desired measurements.

When any of the slide plungers 14 is pushed inward, the bottom outlet opening 44 of the slide plunger may align with the second bottom opening 30 of the hopper 12 to dispense a selected quantity of seasoning from its hollow compartment. When any of the slide plungers 14 is resting in their naturally-biased holding position, the top inlet opening 42 of the slide plunger may align with the first bottom opening 28 of the hopper 12 such that seasoning may flow from the hopper 12 into the slide plunger.

In some embodiments of the invention, as illustrated in FIGS. 2-5, the slide plungers 14 may be labeled according to a number of serving sizes to which they are configured to season. For example, a slide plunger number one may be configured so that its hollow compartment holds enough seasoning to season one serving of a particular food, such as fries, while a slide plunger number two may be configured so that its hollow compartment holds enough seasoning to season two servings of the particular food.

As best illustrated in FIGS. 6-7, the seasoning apparatus 10 may further comprise one or more resilient members 48 each configured to naturally bias at least one of the slide plungers 14 in a holding position in which the seasoning is prevented from being dispensed into the food-holding container 18. The resilient member 48 may also be compressible, extendible, or otherwise actuatable by the sliding movement or actuation of the slide plungers 14. For example, when one of the sliding plungers 14 is pushed by a user further into or toward the hopper 12 to a dispensing position in which the seasoning is dispensed from the hollow compartment 38 into the food-holding container 18, the sliding plunger may compress a corresponding one of the resilient members 48. Once the sliding plunger 14 is released by the user, the resilient member 48 may naturally decompress, thereby actuating the sliding plunger 14 outward to its naturally-biased holding position.

The resilient members 48 may comprise springs or other similar devices configured to be extended or compressed by force but return to a naturally-biased configuration when released from a compressing or extending force. In some embodiments of the invention, the resilient members 48 may be springs wrapped around a rod attached to the slide plungers 14. For example, one of the slide plungers 14 may be positioned to engage one end of one of the springs when pushed toward the spring and another end of the spring may be configured to engage a fixed structure of the seasoning apparatus, such as one of the sidewalls 20 or other portions of the hopper 12 and/or the food-holding container 18.

In embodiments of the invention where the hollow compartments 38 of the slide plungers 14 are of an adjustable size, the seasoning apparatus 10 may further comprise at least one adjustment member configured to be repositioned in a plurality of positions in order to change a size of one of the hollow compartments 38. For example, the adjustment member may be an adjusting block 50 configured to be engaged by an adjusting screw 52. Rotating the adjusting screw 52 may push the adjusting block 50 forward or aftward relative to a corresponding one of the hollow compartments 38. In some embodiments of the invention, the adjusting screw 52 may be the rod noted above and may be fixedly attached to the adjusting block 50, with screw threads formed on the rod. Threads on the rod may engage with threads on a jam nut 54 or similar mechanical device. When the jam nut 54 is rotated and thereby loosened from the rod or adjusting screw 52, the rod may be configured to slide forward or aftward relative to the slide plunger 14, pushing the adjusting block 50 forward or aftward within the hollow compartment 38. By changing the position of the adjusting block 50 relative to the rest of its corresponding slide plunger 14, one of the boundaries or sidewalls 40 of the hollow compartment 38 may be moved closer or further away from an opposing boundary or sidewall of the hollow compartment 38, thereby changing a total volume of the hollow compartment 38. Changing the volume of the hollow compartment 38 changes the amount of seasoning that can be held therein and thus dispensed by a given one of the sliding plungers 14.

The seasoning spreader 16 may comprise an impeller and/or a diffuser configured to spin and/or gravity-spread seasoning dropped thereon when one of the slide plungers 14 is pushed, thereby evenly distributing the seasoning. In some embodiments of the invention, the seasoning spreader 16 or its diffuser may have a unique dome-like shape to match the food-holding container 18 to evenly disperse the seasoning onto the food in the food-holding container. The impeller and/or diffuser of the seasoning spreader 16 may have a plurality of holes 56 formed therein and may be located below the hopper 12 and the second bottom opening 30 of the hopper 12. Gravity may pull seasoning exiting the hopper 12 through the second bottom opening 30 thereof and the seasoning may be evenly distributed by a spinning motion of the impeller. Alternatively, gravity may pull seasoning exiting the hopper 12 through the second bottom opening 30 and onto the diffuser to spread the seasoning evenly, with or without the spinning motion of the impeller. Note that the impeller and/or the slide plungers may be mechanically, electrically, and/or hydraulically driven. For example, mechanical actuation of any of the slide plungers 14 may result in mechanical actuation of the seasoning spreader 16, causing the impeller thereof to spin. Alternatively, electrical actuation via a motor or other electrical actuating means may cause one or more of the slide plungers 14 to be actuated to the dispensing position and/or may cause the impeller of the seasoning spreader 16 to spin.

The food-holding container 18 may be any surface or container configured for support and/or holding the fries or other foods therein to be seasoned. As shown in FIG. 1, the hopper 12 and seasoning spreader 16 may be supported a distance above the food-holding container 18 by the support structure 36 which may or may not be attached or integral with the hopper 12 and/or the food-holding container 18. For example, as illustrated in FIG. 1, the food-holding container 18 may be a rectangular container with four side walls and a bottom wall with a partially-curved surface onto which the fries or food may rest and the seasoning may be dispensed. In some alternative embodiments of the invention, the food-holding container 18 may be omitted and the seasoning apparatus 10 may be portable and held over a food product at a certain height to assist with consistent seasoning of other foods such as burgers, chicken sandwiches, seafood, peanuts, etc.

In some embodiments of the invention, a scale (not shown) may be integrated into the food-holding container 18 and may be configured to weigh specified servings of cooked fries or other foods placed therein. Furthermore, the weights of various servings may electrically or mechanically engage various elements of the seasoning apparatus 10 to dispense a specific pre-measured amount of seasoning corresponding to the specific pre-configured weight applied to the scale, thus making the seasoning process a completely hands-off process, such as in the alternative embodiment of the invention described below. For example, the seasoning apparatus 10 may be configured to activate only when fries or other foods are added (as sensed by the scale). The seasoning apparatus 10 may also be configured to not activate, respond, or otherwise react when fries or other foods are removed from the food-holding container 18 or scale.

In use, the food-holding container 18 may be filled with fries or other type of food to be seasoned. Before or after the food is placed in the container 18, seasoning may be added to the hopper 12 and may thereby drop into the hollow compartments 38 of the slide plungers 14 when the slide plungers 14 are in their naturally-biased holding position. One of the slide plungers 14 may then be actuated to slide inward toward the hopper 12. For example, a user may push one of the slide plungers 14 toward the hopper 12, causing the bottom outlet opening 44 of the slide plunger 14 to align with the second bottom opening 30 of the hopper 12, thus dispensing the seasoning in the hollow compartment 38 of the slide plunger 14.

When the seasoning from the hollow compartment 38 of the slide plunger 14 is dispensed through the second bottom opening 30 of the hopper 12, the seasoning may contact the seasoning spreader 16 and may thereby be dispensed into the food-holding container 18. Simultaneously, the actuation of the slide plunger 14 may actuate the seasoning spreader 16 to spin or otherwise move to assist in spreading the seasoning evenly into the food-holding container 18.

Figure 8:
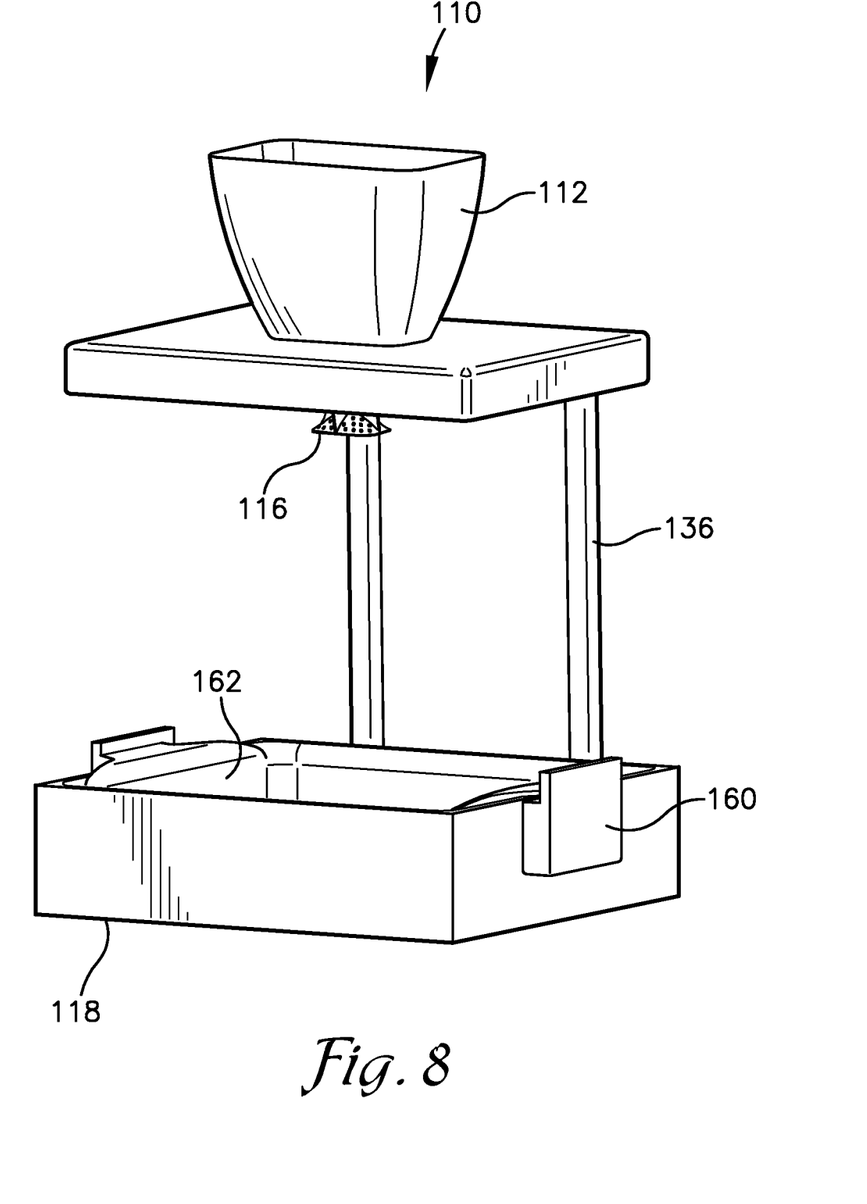
FIG. 8 is a perspective view of a seasoning apparatus constructed in accordance with an alternative embodiment of the present invention.
Figure 9:
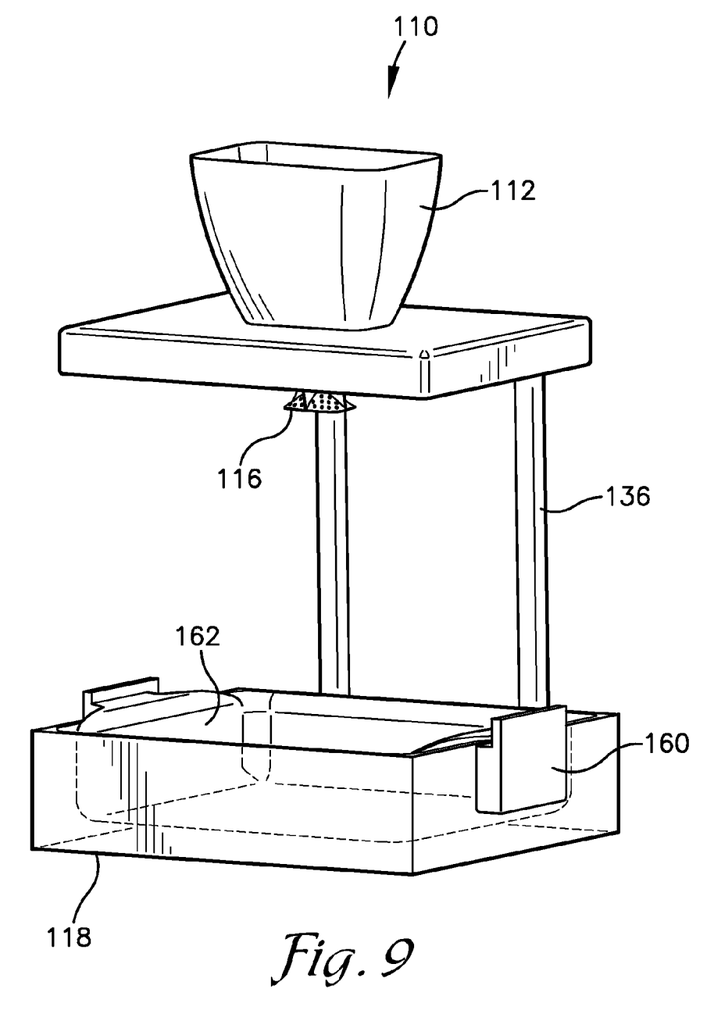
FIG. 9 is a perspective view of the seasoning apparatus of FIG. 8, with its load cells shown in phantom lines.
Figure 10:
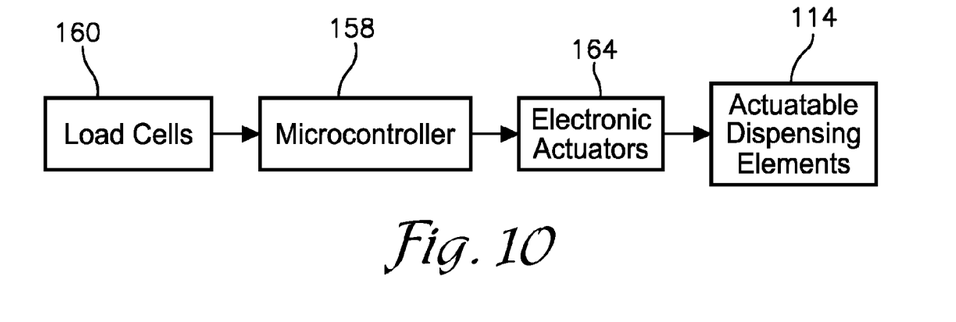
FIG. 10 is a block diagram illustrating an exchange of communication and control signals among components of the seasoning apparatus of FIG. 8.

Once seasoning is dispensed, the user may release or stop pushing the slide plunger 14, thereby allowing the resilient member 48 to actuate the slide plunger 14 back to its naturally-biased holding position. Furthermore, the user may adjust a volume of seasoning held by any of the hollow compartments 38 of the slide plungers 14 by rotating the adjusting screw 52, as described above. The adjusting screw 52 may have a jam nut that should be loosened prior to adjustment A seasoning apparatus 110 constructed in accordance with an alternative embodiment of the invention is illustrated in FIGS. 8-10. The seasoning apparatus 110 comprises a hopper 112, a seasoning spreader 116, and a food-holding container 118, each having at least some of the same characteristics as the seasoning apparatus 10 and its hopper 12, seasoning spreader 16 and food-holding container 18 described above and illustrated in FIGS. 1-7. However, in the seasoning apparatus 110, the slide plungers 14 described above may be omitted. Instead, the hopper 112 may comprise other actuatable dispensing elements 114, such as various electrical and electro-mechanical components configured for measuring and dispensing seasoning to the food product via electronic actuators 164 or motors controlled by a microcontroller 158, as illustrated in the flow chart of FIG. 10. However, in some implementations of the seasoning apparatus 110, the actuatable dispensing elements 114 may include slide plungers, as described above, that are electrically, hydraulically, and/or mechanically controlled by the electronic actuators 164 or by other substantially automated means.

As in earlier embodiments of the invention described above, the hopper 112 may have a plurality of side walls defining a top opening and at least one bottom opening through which the seasoning may be dispensed. The hopper 112 may also be supported by a support structure 136 secured a desired distance above the food-holding container 118. The support structure 136 may comprise, for example, attachment braces extending from the hopper 112 and attachable to a portion of the food-holding container 118. The seasoning spreader 116 may be attached to the support structure 136 and/or the hopper 112 and may be positioned below the bottom openings of the hopper 112. As in earlier embodiments of the invention described above, the seasoning spreader 116 may comprise an impeller and/or a diffuser configured for spreading the seasoning released from the hopper 112 through the bottom opening thereof.

The food-holding container 118 may additionally or alternatively comprise load cells 160 or any other scale configured for communicating with the microcontroller 158 and a holding basket 162 that interfaces with the load cells 160 such that food or other items placed in the holding basket 162 may be weighed by the load cells 160. For example, the load cells 160 may include one or more load cells 160 located at one or more sides of the food-holding container 118. Each of the load cells 160 may send signals corresponding to a weight of the holding basket 162 and/or the food placed therein to the microcontroller 158 for processing.

The microcontroller 158 may be a miniature programmable computer or any such processing device, including any combination of circuits, wires, microcontrollers, computers, and the like. The microcontroller 158 may be configured to process a signal from the load cells 160 or scales of the food-holding container 118 and to send command signals to the electronic actuators or motors. The electronic actuators or motors may respond according to the commend statement from the microcontroller thereby dispensing the pre-measured amount of seasoning based on the wright of the food product.

In use, the seasoning apparatus 110 may have the holding basket 162 with fries or other food therein placed onto or engaged with the load cells 160. The load cells 160 may send a signal to the microcontroller 158 corresponding to a weight of the food in the holding basket 162. Then the microcontroller 158 may use the signal from the load cells 160 to determine how much seasoning should be dispensed from the hopper 112. For example, the microcontroller 158 may comprise or be communicably coupled with a database or look-up table which provides specific amounts of seasoning desired for specific weights of food. Based on the amount of seasoning determined or calculated by the microcontroller 158, the microcontroller 158 may then send a command signal to the electronic actuators or motors 164. The electronic actuators or motors 164 may thereby actuate any of the actuatable dispensing elements 114 to dispense the commanded amount of seasoning. In some embodiments of the invention, the actuatable dispensing elements 114 may comprise the slide plungers of the seasoning apparatus 10 or any other actuatable elements described herein, and the electronic actuators or motors 164 may be configured to push or pull the slide plungers into the dispensing position described above. Furthermore, amounts of seasoning held and/or dispensed by the actuatable dispensing elements 114 may be selected and/or adjusted via the electronic actuators or motors 164. The electronic actuators or motors 164 may also be mechanically and/or communicably coupled with the seasoning spreader 116 to spin the seasoning spreader 116, when seasoning is dispensed from the hopper 112.

Another embodiment of the invention is similar to the seasoning apparatus 110 described above except that the load cells 160 may be omitted. Instead, information related to the quantity of food in the holding basket 162 may be input via an electronic selector panel coupled with the microcontroller 158. The electronic selector panel may have several buttons, switches, and the like that each corresponds to a serving size of food placed in the holding basket 162. A user selects the appropriate button based on the amount of food placed in the baskets, and the selector panel then sends a signal to the microcontroller 158 or the appropriate electronic actuators or motors 164 to dispense the appropriate amount of seasoning based on the button selected.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A seasoning apparatus comprising:
   a hopper configured for holding and selectively dispensing seasoning therefrom;
   at least one actuatable dispensing element having a holding compartment formed therein configured to receive seasoning from the hopper in a holding position and to dispense seasoning from the holding compartment when actuated to a dispensing position;
   a seasoning spreader configured for dispersing seasoning dispensed from the hopper when the actuatable dispensing element is actuated to the dispensing position;
   a food-holding container positioned a distance below the hopper and configured for holding food therein and receiving the seasoning dispersed by the seasoning spreader; and
   a weighing device configured for weighing food in the food-holding container.

2. The seasoning apparatus of claim 1, wherein the hopper comprises at least one side wall, a first bottom wall, and a second bottom wall positioned below the first bottom wall, wherein the first bottom wall has a first bottom opening formed therethrough and the second bottom wall has a second bottom opening formed therethrough and vertically offset from the first bottom opening.

3. The seasoning apparatus of claim 2, wherein the holding compartment of the actuatable dispensing element is formed by one or more sidewalls and has a top inlet opening and a bottom outlet opening vertically aligned with the top inlet opening, wherein the top inlet opening is vertically aligned with the first bottom opening in the holding position and the bottom outlet opening is vertically aligned with the second bottom opening in the dispensing position, such that seasoning passes from the hopper to the holding compartment in the holding position and seasoning in the holding compartment is dispensed through the bottom outlet opening and the second bottom opening in the dispensing position.

4. The seasoning apparatus of claim 3, wherein the actuatable dispensing element is slidably attached to the hopper between the first bottom wall and the second bottom wall, wherein the actuatable dispensing element is translatable relative to the hopper between the holding position and the dispensing position.

5. The seasoning apparatus of claim 1, further comprising a controller and at least one electrical actuator or motor, wherein the controller is configured for receiving a signal indicative of a weight of the food in the food-holding container from the weighing device and sending a command signal to the electrical actuator or motor, wherein the electrical actuator or motor is configured to actuate the at least one actuatable dispensing element based on the command signal received thereby.

6. The seasoning apparatus of claim 3, wherein at least one of the sidewalls of the holding compartment is repositionable relative to others of the sidewalls of the holding compartment, such that repositioning the at least one of the sidewalls of the holding compartment changes a volume of the holding compartment.

7. A seasoning apparatus comprising:
   a hollow hopper configured for holding and selectively dispensing seasoning therefrom;
   a plurality of actuatable dispensing elements each translatably attached to the hopper and each having a holding compartment founed therein configured to receive seasoning from the hopper in a holding position and to dispense seasoning from the holding compartment when translated to a dispensing position;
   a seasoning spreader configured for dispersing seasoning dispensed from the hopper when the actuatable dispensing element is translated to the dispensing position;
   a food-holding container fixed a distance below the hopper and configured for holding food therein and receiving the seasoning dispersed by the seasoning spreader; and
   a weighing device configured for weighing food in the food-holding container.

8. The seasoning apparatus of claim 7, wherein the hopper comprises at least one side wall, a first bottom wall, and a second bottom wall positioned below the first bottom wall, wherein the first bottom wall has a first bottom opening formed therethrough and the second bottom wall has a second bottom opening formed therethrough and vertically offset from the first bottom opening.

9. The seasoning apparatus of claim 8, wherein the holding compartment of each of the actuatable dispensing elements is formed by one or more sidewalls and has a top inlet opening and a bottom outlet opening vertically aligned with the top inlet opening, wherein the top inlet opening is vertically aligned with the first bottom opening in the holding position and the bottom outlet opening is vertically aligned with the second bottom opening in the dispensing position, such that seasoning passes from the hopper to the holding compartment in the holding position and seasoning in the holding compartment is dispensed through the bottom outlet opening and the second bottom opening in the dispensing position.

10. The seasoning apparatus of claim 9, wherein the actuatable dispensing element is translatably attached to the hopper between the first bottom wall and the second bottom wall.

11. The seasoning apparatus of claim 7, further comprising a controller and at least one electrical actuator or motor, wherein the controller is configured for receiving a signal indicative of a weight of the food in the food-holding container from the weighing device and sending a command signal to the electrical actuator or motor, wherein the electrical actuator or motor is configured to actuate the actuatable dispensing elements based on the command signal received thereby.

12. The seasoning apparatus of claim 9, wherein at least one of the sidewalls of the holding compartment is repositionable relative to others of the sidewalls of the holding compartment, such that repositioning the at least one of the sidewalls of the holding compartment changes a volume of the holding compartment.

13. A seasoning apparatus comprising:
   a hollow hopper configured for holding and selectively dispensing seasoning therefrom, the hopper comprising at least one side wall, a first bottom wall, and a second bottom wall positioned below the first bottom wall, wherein the first bottom wall has a first bottom opening formed therethrough and the second bottom wall has a second bottom opening formed therethrough and vertically offset from the first bottom opening;
   a plurality of actuatable dispensing elements each translatably attached to the hopper between the first bottom wall and the second bottom wall and each having a holding compartment formed therein configured to receive seasoning through the first bottom opening of the hopper in a holding position and to dispense seasoning from the holding compartment through the second bottom opening of the hopper when translated to a dispensing position;

a seasoning spreader comprising at least one of an impeller and a diffuser configured to spin and/or gravity-spread seasoning dropped thereon from the hopper when the actuatable dispensing element is translated to the dispensing position;

a food-holding container fixed a distance below the hopper and configured for holding food therein and receiving the seasoning dispersed by the seasoning spreader;

a weighing device configured for weighing food in the food-holding container; and a controller and at least one electrical actuator or motor, wherein the controller is configured for receiving a signal indicative of a weight of the food in the food-holding container from the weighing device and sending a command signal to the electrical actuator or motor, wherein the electrical actuator or motor is configured to actuate the actuatable dispensing elements based on the command signal received thereby.

14. The seasoning apparatus of claim 13, wherein the holding compartment of each of the actuatable dispensing elements is formed by one or more sidewalls and has a top inlet opening and a bottom outlet opening vertically aligned with the top inlet, wherein the top inlet opening is vertically aligned with the first bottom opening in the holding position and the bottom outlet opening is vertically aligned with the second bottom opening in the dispensing position.

15. The seasoning apparatus of claim 13, wherein at least one of the sidewalls of the holding compartment is repositionable relative to others of the sidewalls of the holding compartment, such that repositioning the at least one of the sidewalls of the holding compartment changes a volume of the holding compartment.

* * * * *